July 28, 1953     R. B. DUNHAM     2,646,642
FISH LURE
Filed May 9, 1950
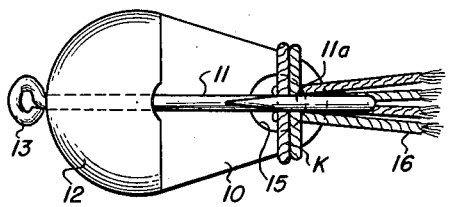
Fig. 1
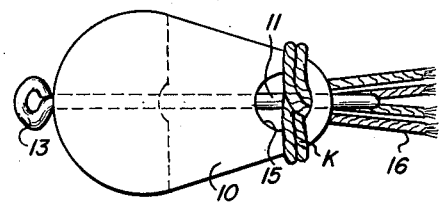
Fig. 2
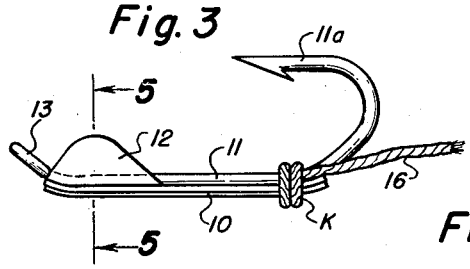
Fig. 3
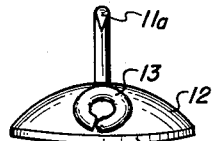
Fig. 4
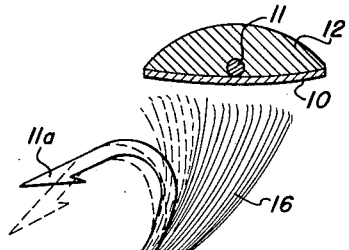
Fig. 5, Fig. 6
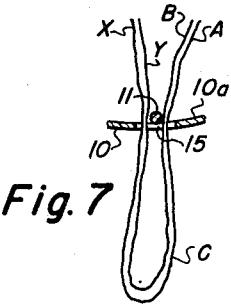
Fig. 7
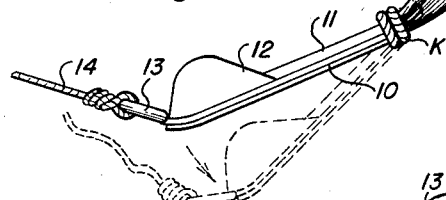
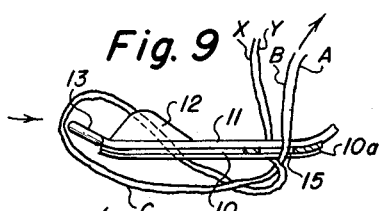
Fig. 9
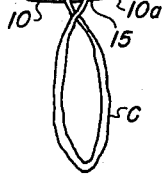
Fig. 8
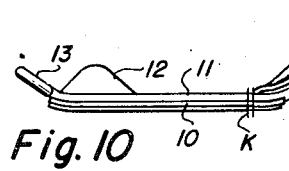
Fig. 10
INVENTOR
Ronald B. Dunham
BY *Irving L. McCathran*
HIS ATTORNEY Patented July 28, 1953

2,646,642

UNITED STATES PATENT OFFICE 2,646,642

FISH LURE

Ronald B. Dunham, Birmingham, Mich.

Application May 9, 1950, Serial No. 160,917

1 Claim. (Cl. 43—42.28)

This device relates to a fish lure, and has for one of its objects the production of a simple and efficient sinking fish lure wherein a hook is carried longitudinally of the spoon, and a weight is carried adjacent the eye of the hook to cause the eye end of the hook and lure to dip and to provide a sinking action with the hook upwardly when tension is released on the line, thereby simulating a swimming action for the lure to attract a fish.

A further object of this invention is the production of a simple and efficient fish lure comprising a light-reflecting spoon and hook, which lure is weighted at one end and wherein the hook always rides with the hook extending upwardly so that upon the release of tension upon the line, the lure will dip and flash in the light to provide an attraction to fish, even without the use of conventional bait.

Other objects and advantages of the present invention will appear throughout the following specification and claim.

In the drawing:

Figure 1 is a top plan view of the fish lure;

Figure 2 is a bottom plan view thereof;

Figure 3 is a side elevational view;

Figure 4 is an end elevational view looking at the eye end of the lure;

Figure 5 is a transverse sectional view taken on line 5—5 of Figure 3;

Figure 6 is a side elevational view illustrating the lure in actual use, with the strands of the tail-piece unravelled to shield the hook from view;

Figure 7 is a fragmentary transverse sectional view of the spoon, the first step in securing the tail-piece to the spoon being illustrated;

Figure 8 is a fragmentary transverse sectional view of the spoon illustrating the second step;

Figure 9 is a fragmentary side elevational view of the lure, certain parts of the spoon being shown in section and also illustrating the third step in securing the tail-piece to the spoon;

Figure 10 is a fragmentary side elevational view of the lure, illustrating the final step in securing the tail-piece to the spoon and unravelling the tail-piece.

By referring to the drawing in detail, it will be seen that 10 designates the spoon of the lure, which preferably is made of gold, nickel, copper, brass, or any other suitable material. The material used, preferably is of the type which will flash in the light or reflect the light when the lure dips or changes its position, the flash of light constituting a means to attract the fish. The spoon 10 preferably is dished as shown, but may be made in various suitable shapes, sizes or from various materials without departing from the spirit of the invention. The spoon 10 carries a longitudinally extending hook 11, the shank of which fits upon the upper face of the spoon 10 and the shank of the hook is located along the central longitudinal axis of the spoon, as shown in Figure 1. The spoon is rounded at both ends and tapers from its relatively broad rounded line-engaging end to the restricted or narrowed tail-piece carrying end. A broad and upwardly tapering weight 12 is secured to the upper face of the spoon and extends transversely across the entire width of the line-engaging end and longitudinally of the spoon for a distance of more than one-third of the length of the spoon as shown in Figures 1 and 2, and securely anchors the hook upon the upper face of the spoon 10. The shank of the hook 11 is provided with an outwardly and upwardly inclined line-engaging eye 13 adjacent the weight 12, as shown in Figures 1 and 3, to which eye 13 the conventional fishing line 14 is secured in a conventional manner. The barb 11$^a$ of the hook is carried above the small end 10$^a$ of the spoon 10 and points toward the line 14 and eye 13.

The spoon 10 is provided with an enlarged circular aperture 15 at the small end 10$^a$ of the spool 10, and the shank of the hook 11 extends across and bisects the aperture 15 and slightly beyond the small end 10$^a$ of the spoon 10. A tail-piece 16, preferably formed of wool strands is secured or tied in position around the shank of the hook 11, through the aperture 15 and around the small end of the spoon 10 in the manner as set forth in the following, two strands being illustrated.

The tail-piece 16 includes a gripping portion K surrounding the shank and having a plurality of rearwardly projecting end portions which extend beyond the barb 11$^a$. These end portions also extend outwardly through the aperture 15 which constitutes a segmental aperture since the shank of the hook 11 extends across and bisects the aperture 15, as shown. These end portions extend upon each side of the shank of the hook 11, thereby defining a loop portion located below the spoon 10. This loop portion is provided with a twisted portion which extends down around the spoon 10 adjacent the aperture 15 to tie the strands of the tail-piece 16. The strands are provided with an unravelled portion shown in Figure 6, which unravelled portion extends beyond the barb to define a feather-like shield for the barb beyond the barb. To facilitate an understanding as to how the finished structure of the tail-piece is obtained, attention is invited to the four steps enumerated as follows:

*First step.*—Strands A and B are threaded downwardly through the aperture 15 to one side of the shank of the hook 11 and then threaded upwardly through the aperture 15 upon the opposite side of the shank of the hook 11 to define protruding ends X and Y and form a depending loop C, the ends of the strands A and B protruding likewise, as shown in Fig. 7.

*Second step.*—The loop C then is twisted adjacent the spoon 10, as shown in Figure 8.

*Third step.*—The loop C then is slipped over the eye end of the spoon 10 and is in the direction of the arrow shown in Figure 9.

*Fourth step.*—The protruding ends X and Y are then drawn upwardly to tighten the gripping portion K around the small end 10a of the spoon 10 to lock the strands in a secure position. The strands are then trimmed to an even length and all four strands A, B, X and Y are unravelled to provide a feathered shield for the barb 11a of the hook, as shown in Figure 6.

It should be noted that the shape of the lure and the position of the weight upon the spoon, as well as the location of the eye 13 which is attached to the line 14, will cause the lure to follow a straight course. When tension is released upon the line 14, the lure will dip with the weighted end lowermost and the barb 11a of the hook 11 will always ride upwardly of the spoon 10. The present fish lure is especially adapted for summer and winter fishing and for fishing for blue gill, trout, bass and perch. The lure may be used to advantage for catching fish under ice through an opening in the ice, as well as for fishing in the spring and summer. With the present lure no sinker is necessary since the lure is weighted. The barb 11a may be baited with grub, corn borer, salmon egg, or a piece of wiggler. At times, no bait is needed because of the dipping movement of the lure.

It should be understood that certain detail changes in the mechanical structure may be made without departing from the spirit of the invention, so long as such changes fall within the scope of the appended claim.

Having described the invention, what is claimed as new is:

A fish lure comprising a tapering spoon defining a relatively small restricted tail-piece carrying end having an enlarged circular aperture therein, a hook having a shank extending longitudinally of the spoon and spanning and bisecting said aperture thereby defining a relatively large segmental aperture in the spool to each side of the shank to facilitate the threading of a tail-piece therethrough, a line-attaching means at one end of said hook, a barb at the opposite end of said hook, a tail-piece including a gripping portion surrounding the shank and having a plurality of strands with rearwardly projecting end portions extending beyond the barb and also extending outwardly through the segmental aperture upon each side of the shank, said gripping portion having a loop portion extending below the spoon, the loop portion having a twisted portion extending around the spoon adjacent the aperture to tie the strands, and the strands having unravelled portions extending beyond the barb to define a feather-like shield for the barb beyond the barb.

RONALD B. DUNHAM.

References Cited in the file of this patent

UNITED STATES PATENTS

| Number | Name | Date |
| --- | --- | --- |
| 813,500 | Kausch | Feb. 27, 1906 |
| 1,460,905 | Huntington | July 3, 1923 |
| 1,466,231 | Johnson | Aug. 28, 1923 |
| 1,546,105 | Powell | July 14, 1925 |
| 1,640,599 | Conn | Aug. 30, 1927 |
| 1,789,630 | Knight | Jan. 20, 1931 |
| 1,925,197 | Maynard | Sept. 5, 1933 |
| 2,018,622 | Davenport | Oct. 22, 1935 |
| 2,095,425 | Tveter | Oct. 12, 1937 |
| 2,185,771 | Mann | Jan. 2, 1940 |